(12) United States Patent
Morgan et al.

(10) Patent No.: US 9,169,898 B2
(45) Date of Patent: Oct. 27, 2015

(54) DRAGLINE ROPE FERRULE

(75) Inventors: Andrew Morgan, New South Wales (AU); Norman Green, New South Wales (AU)

(73) Assignee: Bekaert Wire Ropes Pty Ltd, Sydney (AU)

( * ) Notice: Subject to any disclaimer, the term of this patent is extended or adjusted under 35 U.S.C. 154(b) by 380 days.

(21) Appl. No.: 13/581,081

(22) PCT Filed: Feb. 25, 2011

(86) PCT No.: PCT/AU2011/000214
§ 371 (c)(1),
(2), (4) Date: Nov. 5, 2012

(87) PCT Pub. No.: WO2011/103640
PCT Pub. Date: Sep. 1, 2011

(65) Prior Publication Data
US 2013/0047572 A1   Feb. 28, 2013

(30) Foreign Application Priority Data

Feb. 26, 2010  (AU) .................................. 2010900840
Jun. 21, 2010  (AU) .................................. 2010902730

(51) Int. Cl.
*F16G 11/02* (2006.01)
*B21D 39/04* (2006.01)
(Continued)

(52) U.S. Cl.
CPC ................ *F16G 11/02* (2013.01); *B21D 39/04* (2013.01); *D07B 9/00* (2013.01); *E02F 3/54* (2013.01); *Y10T 24/398* (2013.01); *Y10T 29/49826* (2013.01)

(58) Field of Classification Search
CPC .......... D07B 9/00; B21D 39/04; F16G 11/02; E02F 3/54
USPC ....................................................... 57/200, 210
See application file for complete search history.

(56) References Cited

U.S. PATENT DOCUMENTS 1,643,110 A * 9/1927 Briggs ........................... 403/368
1,910,269 A * 5/1933 Sunderland ................... 403/284
(Continued)

FOREIGN PATENT DOCUMENTS

DE       37 22 062 A1     1/1989
DE       298 20 129 U1    5/2000
(Continued)

OTHER PUBLICATIONS

Australian Examination Report No. 1 Corresponding to Australian Patent Application No. 2012100744; Date of Issue: Mar. 4, 2013; 4 Pages.
(Continued)

*Primary Examiner* — Shaun R Hurley
(74) *Attorney, Agent, or Firm* — Myers Bigel Sibley & Sajovec

(57) ABSTRACT

A method is disclosed for attaching a ferrule to a dragline rope. The method comprises locating the dragline rope in a die of a die-press, locating over the dragline rope a ferrule that is lined internally with a deformable material, and forcing the ferrule longitudinally through the die. The ferrule is caused to be internally expanded and be extruded back over the dragline rope, causing the lining to deform directly against the dragline rope and fastening the ferrule to the dragline rope.

13 Claims, 5 Drawing Sheets

(51) Int. Cl.
   *D07B 9/00*   (2006.01)
   *E02F 3/54*   (2006.01)

(56) References Cited

U.S. PATENT DOCUMENTS

| | | | |
|---|---|---|---|
| 3,220,074 A | | 11/1965 | Ehmann |
| 3,638,975 A | | 2/1972 | Buettner |
| 3,861,811 A | * | 1/1975 | Mason et al. ............ 403/41 |
| 4,055,365 A | * | 10/1977 | Kucherry ............ 294/82.14 |
| 6,696,974 B1 | * | 2/2004 | Mathis ............ 340/854.7 |
| 2002/0172547 A1 | | 11/2002 | Hong |
| 2006/0160435 A1 | | 7/2006 | Campbell et al. |

FOREIGN PATENT DOCUMENTS

| | | |
|---|---|---|
| GB | 1 249 352 A | 10/1971 |
| GB | 1 369 211 A | 10/1974 |
| GB | 2 113 732 A | 8/1983 |
| GB | 2 385 065 B | 8/2005 |
| JP | 64-014385 A | 1/1989 |
| JP | 2010-070882 A | 4/2010 |
| RU | 102 723 U1 | 3/2011 |

OTHER PUBLICATIONS

IP Australia—Patent Examination Report No. 1 corresponding to Australian Patent Application No. 2011220342; Date of Issue: Feb. 4, 2014; 4 pages.
Colombia Steel—Ferrule Dump Socket, Retrieved on Feb. 22, 2012, http://web.archive.org/web/20080509053841/http://columbiasteel.com/ferrule.dump.socket.html, published on May 9, 2008 per Wayback Machine, 1 page.
Examiner's Report No. 2 on Innovation, Australian Pat. No. 2011101572; Date Mailed: May 15, 2012; 2 Pages.
Examiner's First Report on Innovation, Australian Pat. No. 2011101572; Date Mailed: Feb. 23, 2013, 2 Pages.
International Preliminary Report on Patentability corresponding to International Application No. PCT/AU2011/000214; May 30, 2012; 25 pages.

* cited by examiner

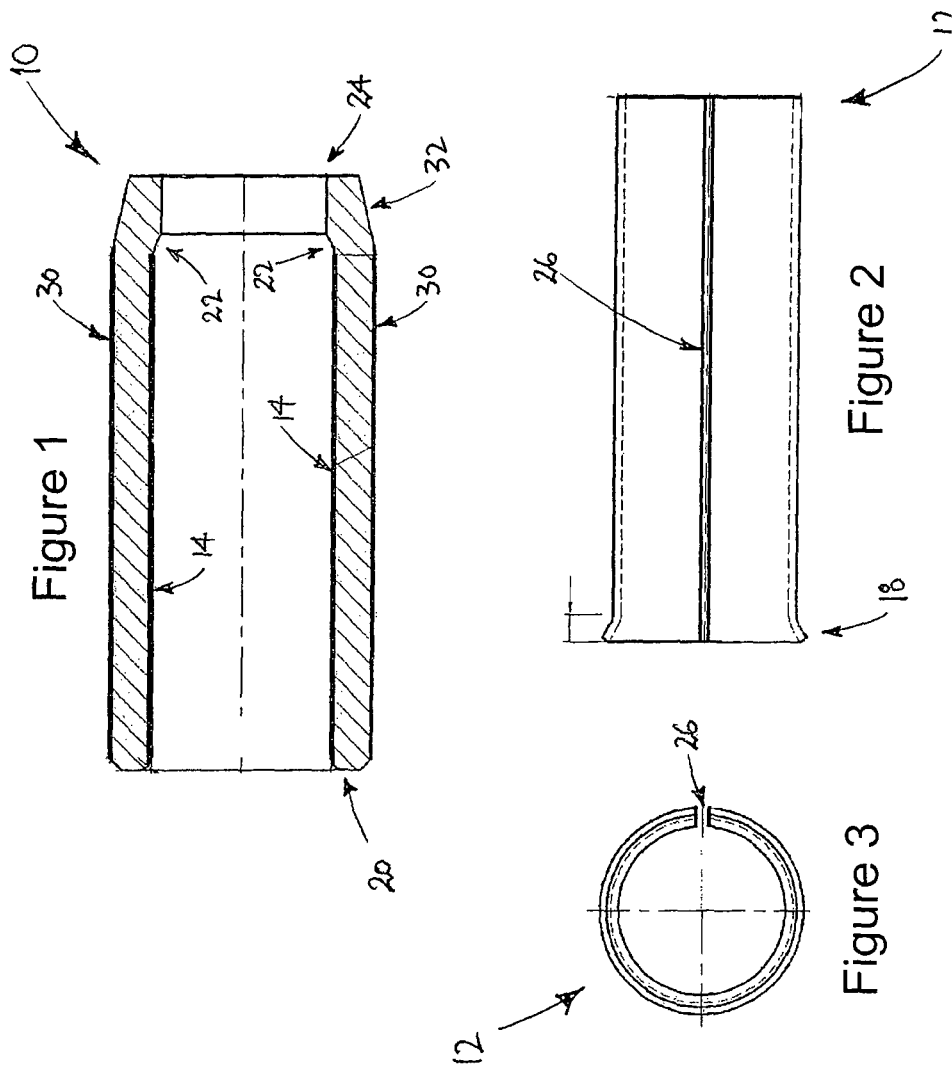

DRAGLINE ROPE FERRULE

RELATED APPLICATIONS

This application is a 35 U.S.C. §371 national stage application of PCT Application No. PCT/AU2011/000214, filed on Feb. 25, 2011, which claims priority from Australian Patent Application No. 2010900840, filed Feb. 26, 2010, and Australian Patent Application No. 2010902730, filed Jun. 21, 2010, the contents of which are incorporated herein by reference in their entireties.

TECHNICAL FIELD

Disclosed is a method for attaching a ferrule to a dragline rope, as well as a dragline rope comprising a ferrule, and a ferrule for the dragline rope. The method finds particular, though not exclusive, application in relation to dragline dump ropes, and will in part be described in this context. However, it is to be appreciated that the method can be employed to attach ferrules to hoist as well as drag ropes in a dragline. The method can also be employed on other steel wire ropes that are used in both mining and civil engineering applications, where a high degree of ferrule-to-rope securement is required.

BACKGROUND ART

Large capacity mining draglines subject a dragline bucket to enormous forces and loads. The ropes (also referred to as "cables") are employed in draglines to control the various movements of the bucket, and accordingly experience extreme and rapid wear, especially at the sheaves in components of the dragline. For example, hoist ropes may need to be replaced every 3-6 months, drag ropes every 1-3 months and dump ropes every 1-2 weeks. Rope replacement is time consuming, with "downtime" of the dragline representing a significant cost in mining operations.

Minimizing the rope changeover time and improving rope integrity so as to decrease the incidence of ferrule-to-rope failure can each contribute to downtime reduction and improved operating cost and efficiency.

It is known to connect ferrules to wire ropes by a swaging method or a jaw-pressing method. Such methods have been observed to provide sufficient securement of the ferrule to the wire rope for a number of applications in which wire ropes may be employed. However, such methods are unlikely to provide sufficient securement of a ferrule to a wire rope for dragline conditions.

GB 1,369,211 discloses a ferrule on a wire rope. The ferrule can be secured to the wire rope by swaging or by a type of die-pressing that imparts a shaped profile to the ferrule. In other words, the ferrule is die-pressed by a die set that is laterally directed to press the shaped profile onto the ferrule. The profiling of the ferrule necessitates a lateral pressing, hence the method of GB 1,369,211 is not concerned with nor able to address the securement requirements of a ferrule to a dragline rope.

GB 2,113,732 discloses a connecting device for the end of a wire rope to enable the end to be connected to a hook or bolt. A ferrule is secured to the wire rope by a swaging operation. The secured ferrule retains a proximal end of a connecting coupling onto the end of the rope, with a distal end of the coupling being internally threaded for receiving therein an externally threaded shank of the hook or bolt. Again, the method of GB 2,113,732 is not concerned with addressing the securement requirements of a ferrule to a dragline rope.

The above references to the background and prior art do not constitute an admission that such art forms a part of the common and/or general knowledge of a person of ordinary skill in the art. The above references are also not intended to limit the application of the method disclosed herein.

SUMMARY OF THE DISCLOSURE

In a first aspect there is disclosed a method for attaching a ferrule to a dragline rope. The method comprises:
  locating the dragline rope in a die of a die-press;
  locating over the dragline rope a ferrule that is lined internally with a deformable material;
  forcing the ferrule longitudinally through the die whereby the ferrule is caused to be internally expanded and be extruded back over the dragline rope, deforming the lining directly against the dragline rope and fastening the ferrule to the dragline rope.

Such a method has been optimised towards increasing the pull-off strength of the ferrule in relation to a dragline rope (i.e. the force required to pull the ferrule off the rope). Increased pull-off strength means that the dragline rope is able to withstand higher forces when located in e.g. a dump socket, whereby the ferrule is less likely to be pulled off in use, thus decreasing the incidence of dragline rope failure caused by ferrule-to-rope failure. Also, an intact ferrule-to-rope attachment can better facilitate rope changeover, whereby the intact ferrule can be more easily detached from e.g. a dump socket. These two factors contribute towards more dragline "uptime" (i.e. the dragline spends less non-operating downtime waiting for rope servicing and changeover).

By deforming the lining directly against and into the dragline rope, the method has been observed to provide the ferrule with a pull-off strength of up to 60-70% of the rope breaking force. This level of strength has been observed to be effective in reducing the incidence of dragline rope failure at the ferrule, thus increasing dragline uptime. In this regard, premature servicing due to ferrule pull-off can be avoided, with eventual rope wear (e.g. at the sheaves) instead being the cause for rope servicing/replacement.

In one embodiment of the method, the dragline rope is a multi-stranded wound wire rope, with each strand defining a lay length. In such case the ferrule can be die-pressed onto the rope so as to provide a ferrule length that is approximately 70% of the lay length. Further, the ferrule length may correspond to approximately four times a diameter of the rope once the ferrule has been die-pressed onto the rope. Again, by optimising the ferrule length to the lay length of the dragline rope, the method has been observed to contribute to ferrule pull-off strength.

The method has also been observed to provide favourable pull-off results when compared to existing swaging and jaw-press methodologies used to attach ferrules to ropes in other fields. In this regard, as a result of the longitudinal die-pressing of the ferrule onto the dragline rope, the ferrule and its lining are caused to be more evenly extruded over and more significantly deformed against the dragline rope, thereby bringing the ferrule and its lining into more intimate contact with, and causing the ferrule and lining to flow into the interstices/valleys between, strands of the rope, as compared with jaw press/swaging methodologies.

In one embodiment of the method, the ferrule is located over the rope adjacent to but inset from an end thereof. A "rope-end" location is a usual (though not exclusive) ferrule location and, when located at the rope end, the ferrule can assist with rope connection in the dragline (e.g. enabling the ferrule to be positioned in a dump socket).

In one embodiment of the method, the amount of ferrule inset adopted corresponds to an amount the ferrule is caused to be extruded back over the rope to its end during the forcing of the ferrule through the die. In other words, the resultant dragline rope can comprise a ferrule that terminates at the rope end (providing a "square" end finish) rather than leaving an end of the rope exposed. An exposed rope end can otherwise cause handling issues, and be subject to damage and fraying etc.

In one embodiment of the method, the ferrule can be forced through the die by a mandrel that is initially arranged to oppose the die as well as an end of the ferrule. When the mandrel is advanced against the ferrule (e.g. by a hydraulic ram) to force it into the die, this can cause the ferrule to be internally expanded against and be extruded back over the rope, with the ferrule external diameter reducing accordingly.

In one embodiment of the method, prior to locating the ferrule over the rope, the ferrule can have a number of e.g. fine grooves or threads formed on its external surface. These grooves can assist in the die-pressing process in that they can receive and distribute a lubricant over the ferrule external surface, to facilitate ferrule passage into and deformation by the die.

In one embodiment of the method, prior to locating the ferrule over the rope, the ferrule external surface can be coated with a lubricant (e.g. an anti-friction coating) over the ferrule external surface, to facilitate ferrule passage into and deformation by the die.

In one embodiment of the method, a body of the ferrule is of metal (e.g. of a mild steel, such as a low carbon, low manganese steel). A hollow interior of the body may have a number of fine grooves or threads formed on its surface, prior to locating the ferrule over the rope. These grooves or threads can be adapted for interacting with the ferrule lining of deformable material (i.e. by binding/securing together the ferrule and the lining during and after die-pressing onto the rope).

In one embodiment of the method, the lining of deformable material comprises a metal of lower yield strength than the body. The lining can take the form of a metal sleeve (e.g. an aluminium sleeve), with the sleeve being located within the ferrule body prior to locating it over the rope. Then, during the forcing of the ferrule through the die, the lining can be caused to be forced against and be extruded back over the rope. When so extruded, the lining material deforms and flows into the valleys of the rope, thereby improving the inter-engagement of the ferrule and the rope.

In one embodiment of the method, when the ferrule is fastened to an end of the dragline rope, and after fastening of the ferrule to the rope, the ferrule can have a lug secured to a distal end thereof. Such a lug can e.g. be welded onto the end of the ferrule after fastening.

The lug can allow for towing of the dragline rope into position in a dragline assembly. Further, it can maintain alignment of the ferrule when it is located in a connection socket. In addition, it can prevent the dragline rope from unravelling when e.g. a bolt is placed through the eye of the lug, by preventing rotational movement of the rope (i.e. rope unravelling can lead to premature rope failure).

In a second aspect there is disclosed a dragline rope comprising a die-pressed ferrule thereon.

It has been discovered that where a ferrule has been die-pressed onto a dragline rope it has increased "pull-off" strength, and especially when compared to other ropes having comparable length ferrules secured thereto by known swaging or jaw-pressing techniques.

The ferrule may be die-pressed onto the dragline rope in accordance with a method as set forth in the first aspect.

In one embodiment, when the dragline rope is of stranded wire (such as e.g. a 6 or 8 strand helically wound steel wire rope in which the strands extend around a core or king wire) the resultant length of the die-pressed ferrule can be optimised to the specific lay length of the given rope (i.e. working towards an optimum length of ferrule in contact with each lay of strand).

A primary use of the dragline rope can be as a dump rope, though the ferrule can be adapted for use with a drag rope and/or a hoist rope.

In a third aspect there is disclosed a dragline rope ferrule. The ferrule is adapted for being die-pressed onto a multi-stranded wound wire rope (e.g. a 6 or 8 strand helically wound steel wire rope extending around a core or king wire). Each such strand can define a lay length.

In accordance with the third aspect, the ferrule can be provided with a length that corresponds to a predetermined proportion of the lay length, once the ferrule has been die-pressed onto the rope. In this regard, the ferrule pull-off strength has been found to be related to the length of ferrule in proportion to the lay length (whereby an optimum length of ferrule in contact with each lay of strand is determined).

For example, for a helically wound wire rope, predetermining the ferrule length such that it at least approximately corresponds to up to 70% of the lay length, results in a pull-off strength that is approximately 70% of the rope breaking force. It has been observed that a pull-off strength that is 70% of rope breaking force is sufficient for use in dragline rigging. However, it has also been observed that a ferrule length that is beyond 70% of the lay length can cause interference when fitting the rope into the dragline rigging.

In one embodiment the ferrule can be provided with a length that corresponds approximately to four times a diameter of the rope once the ferrule has been die-pressed onto the rope. It has also been observed that predetermining the ferrule length such that it at least approximately corresponds to four times a diameter of the rope results in an increased pull-off strength.

Again the dragline rope ferrule of the third aspect can comprise a hollow body of e.g. mild steel, and the body can be internally lined with e.g. a metal of lower yield strength than the body metal (e.g. a sleeve of aluminium).

In the ferrule of the third aspect the lining can comprise a sleeve that is flared at one end. The flared end can engage with a respective end of the ferrule when the sleeve is positioned therein, to help guide the rope into the ferrule and to help locate the sleeve. In use, the flared end can be located at that end of the ferrule through which a dragline rope end is introduced prior to die-pressing.

In the ferrule of the third aspect the body can comprise an internal annular constriction located at a body end that in use sits adjacent to the rope end (i.e. an end that is engaged by a mandrel during die-pressing). The constriction can provide increased strength to the ferrule such that it better resists swelling and buckling resulting from the compressive forces induced by die-pressing.

In the ferrule of the third aspect the body can be provided with an external chamfer that is located at the body end that in use sits adjacent to the rope end prior to die-pressing. The chamfer provides a space to receive therein a flow of body metal that occurs along an outer portion of the ferrule during die-pressing, whereby a "square" ferrule end without flashing can result.

In the dragline rope ferrule of the third aspect the body and lining can be adapted such that the lining terminates from an end of body, being that end of the ferrule which in use is located at or adjacent to an end of the rope. This can prevent the lining from being "squeezed out" of the body during die-pressing.

The ferrule of the third aspect can otherwise be as defined in the first and second aspects.

BRIEF DESCRIPTION OF THE DRAWINGS

Notwithstanding any other forms which may fall within the scope of the ferrule and method as set forth in the Summary, a specific embodiment will now be described, by way of example only, with reference to the accompanying drawings in which:

FIG. 1 shows a side sectional view of a first embodiment of a ferrule body as set forth in the Summary;

FIGS. 2 and 3 respectively show side and end views of an embodiment of a ferrule lining as set forth in the Summary;

DETAILED DESCRIPTION OF A SPECIFIC EMBODIMENT

Figure 4:
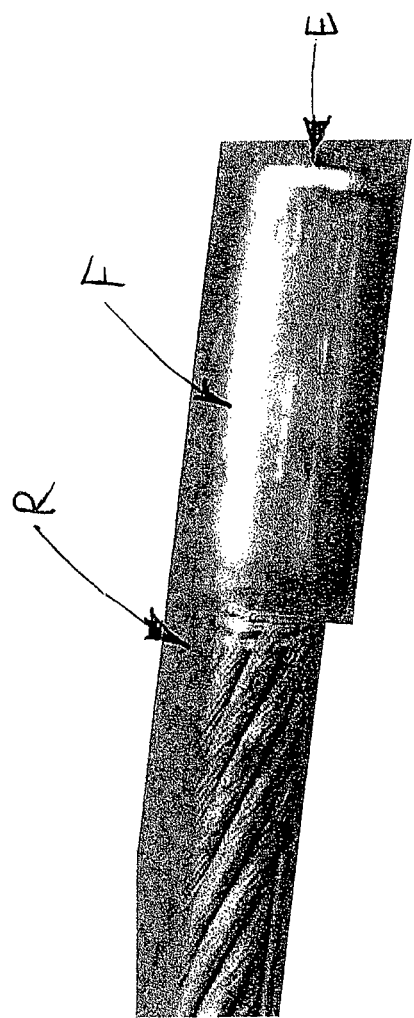
FIG. 4 shows a ferrule comprising the assembled body and lining of FIGS. 1 to 3 having been die-pressed onto the end of a dragline rope.

Referring firstly to FIGS. 1 to 3, a hollow ferrule body 10 and a ferrule insert sleeve 12 are shown. The sleeve is inserted into the body to define a ferrule assembly to be die-pressed onto a dragline rope (the assembly is often simply referred to herein as a "ferrule"). A primary use of the ferrule is in a dragline dump rope, though the ferrule can be readily adapted for use with a drag rope and/or a hoist rope in a dragline.

Die-pressing the ferrule onto the dragline rope increases pull-off strength (i.e. increases the force required to pull the ferrule off the rope). For example, die-pressing has been observed to increase the force required to pull the ferrule off the rope by up to 60-70% of the rope breaking force. This represents a significant increase when compared to existing ferrule-to-rope attachment methodologies (jaw-press and swaging).

In use, the ferrule length is predetermined to approximately correspond to up to 70% of the lay length. As discussed below, this results in a pull-off strength that is approximately 70% of the rope breaking force, which is sufficient for use in dragline rigging. In use, the ferrule length is predetermined to not go beyond 70% of the lay length as this can cause interference when fitting the rope into the dragline rigging.

In use, with such a pull-off strength, the ferrule is better able to withstand high forces at the sockets employed to connect the rope to the dragline components. This can decrease the incidence of rope "failure" due to ferrule-to-rope failure. Maintaining an intact ferrule-to-rope attachment can also facilitate rope changeover, in that it is rope wear at the sheaves that eventually causes rope changeover, rather than rope failure at a socket. An intact ferrule-to-rope attachment also allows the ferrule to be readily and more easily detached from a socket (e.g. a dump socket).

The ferrule is specifically adapted for being die-pressed onto the dragline rope. In this regard, the ferrule body 10 of can be of an extrudable/deformable metal, for example, a carbon steel alloy such as AISI 1020. In AISI 1020, the "10" designates a basic plain carbon steel and the "20" designates the approximate carbon content. For example, a suitable steel is a hot roll 1020—which is a general purpose, mild, low-carbon, low-manganese machine steel with good overall, structural steel properties. This steel demonstrates high machineability capacity and excellent welding characteristics.

The sleeve comprises a metal of lower yield strength than the body metal, for example, aluminium. When die-pressed onto a dragline rope of stranded wire (e.g. a 6 or 8 strand helically wound steel wire rope in which the strands extend around a core or king wire) the sleeve 12 is accordingly deformed and extruded to a greater extent than the body 10, and thus tends to be squeezed and flows into the regions (valleys) between adjacent wire strands, thus better securing the ferrule to the rope. The sleeve can thus help increase the ferrule pull-off force (e.g. up towards 70% of the rope breaking force).

An interior surface 14 of the body 10 can be provided therein (e.g. by a threading tool) with a number of fine grooves or threads, prior to locating the sleeve in the body. Again, during die-pressing, the sleeve 12 is deformed and flows into the grooves/threads at surface 14, thus better binding/securing the ferrule body to the sleeve.

The sleeve 12 is flared (or bell-mouthed) 18 at one end. This initially restricts the amount of sleeve insertion into the ferrule body 10, whereby the flared end 18 is retained at the open insertion end 20 of body 10. The flaring also improves the feeding of the rope into the ferrule/sleeve combination, and further helps to prevent the insert from sliding during rope insertion and as the ferrule is being die-pressed onto the rope.

Further, the hollow interior of the body 10 has an annular constriction 22 located adjacent to its opposing end 24 (i.e. the end that in use sits adjacent to the rope end). The annular constriction inside the ferrule provides an increased area for the mandrel to push against during die-pressing (see FIG. 5). The annular constriction also reinforces the end of the ferrule in order to prevent the ferrule from swelling and buckling before and as it enters the die (i.e. resulting from the compressive stresses that occur in the ferrule during the die-pressing operation). It has been observed that ferrules without such reinforcement can become jammed in the die.

The annular constriction 22 also helps prevent the sleeve from sliding and being "squeezed out" at end 24 as the ferrule is being die-pressed, such that a "clean", delimited end of the ferrule results.

Further, the sleeve 12 is provided with a longitudinal passage 26 through its length. Thus, a sleeve diameter can be selected that requires a push-fit of the sleeve into the body 10, with the passage allowing the sleeve walls on either side of the passage to flex, to allow the push-fit to occur. Once inserted, the sleeve again slightly expands within the hollow body to be frictionally retained therein, ready for use in the die-pressing procedure.

Prior to locating the ferrule over the rope, the ferrule body can also be provided with (e.g. by machining) a number of fine grooves or threads on its external surface 30. These grooves can assist in the die-pressing process, in that they can receive and distribute a lubricant over the external surface 30, to facilitate ferrule deformation by, and passage into and through, the die.

The external surface of the body is also chamfered 32 at the opposing end 24. The chamfer provides space for the flow of metal along the outer surface of the ferrule during die-pressing (i.e. during die-pressing metal flows along the ferrule and fills the chamfer "void"). This reduces or eliminates flash at the end of the ferrule, which must otherwise be ground smooth to eliminate safety concerns during subsequent handling of the ferrule. A square ferrule end thus results at the rope end.

Figure 6:
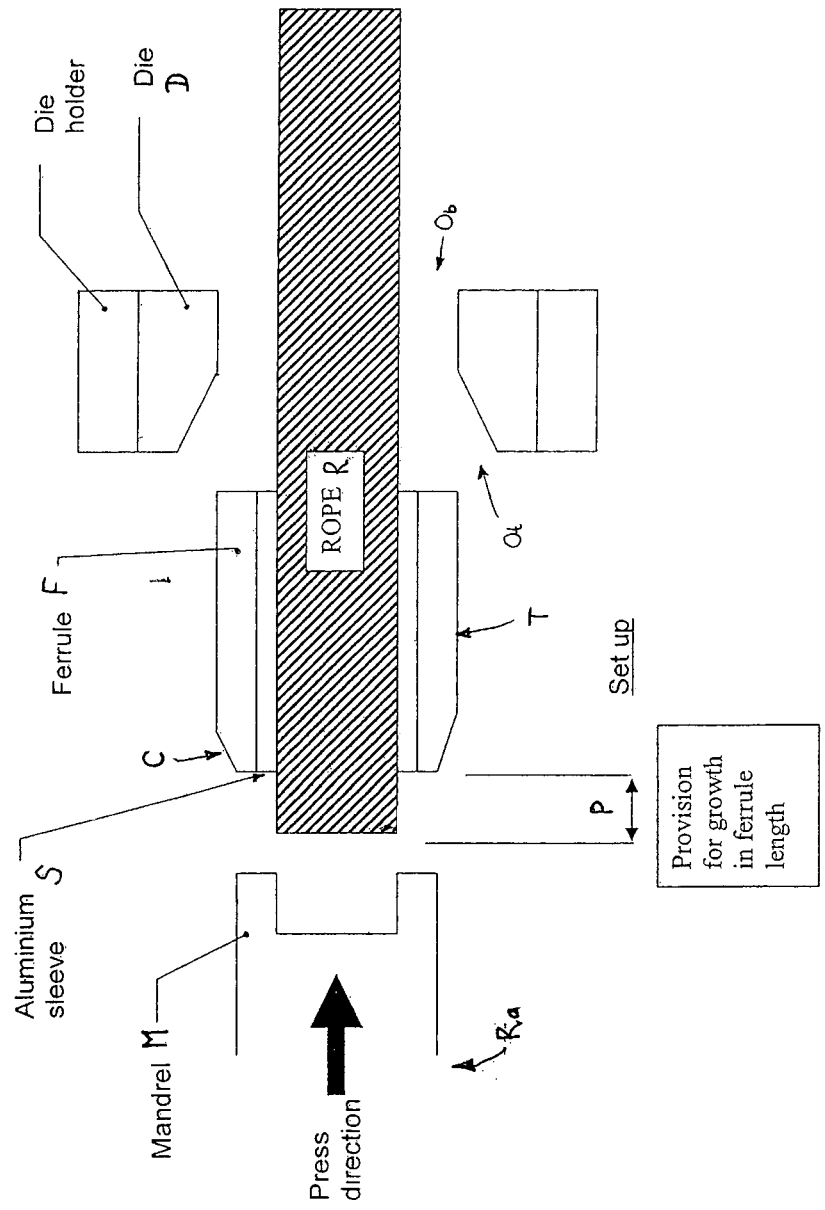
FIG. 6 shows a schematic depiction of apparatus and a process for die-pressing a ferrule onto a dragline rope.

Prior to die-pressing, the ferrule assembly F is located over the rope adjacent to but inset from the rope end (see FIG. 6). The amount of ferrule inset adopted (see distance P in FIG. 6) typically corresponds to an amount the ferrule is caused to be extruded back over the rope to its end during the forcing of the ferrule through the die. As shown in FIG. 4, in the resultant dragline rope R the ferrule F terminates at the rope end E, rather than leaving an end of the rope exposed (which would otherwise be subject to damage and fraying, handling dangers, etc).

Referring now to FIGS. 5A to 5D, where like reference numerals are used to denote similar or like parts, a second embodiment of a ferrule F' is shown as having been fastened to a dragline rope R', terminating at the rope end. The ferrule F' is similar in most respects to the ferrule F of FIGS. 1 to 4, and will not be redescribed.

However, the ferrule F' differs in that a lug 50 has been secured to a distal end E' of the ferrule. The lug 50 comprises an annular plate 52 and a loop 54 welded thereto. Typically the lug plate 52 is welded onto the end of the ferrule after fastening. The lug 50 serves three purposes:
1. It allows for towing of the dragline rope into position in a dragline assembly.
2. It maintains alignment of the ferrule when it is located in a connection socket (e.g. a dump socket).
3. It prevents the dragline rope from unravelling when e.g. a bolt is placed through the eye of the lug, by preventing rotational movement of the rope (i.e. rope unravelling can lead to premature rope failure).

Non-limiting examples of a ferrule-to-rope attachment procedure and testing methodology will now be provided.

Example 1

Die-Pressing of Ferrule onto a Dragline Rope

Figure 5:
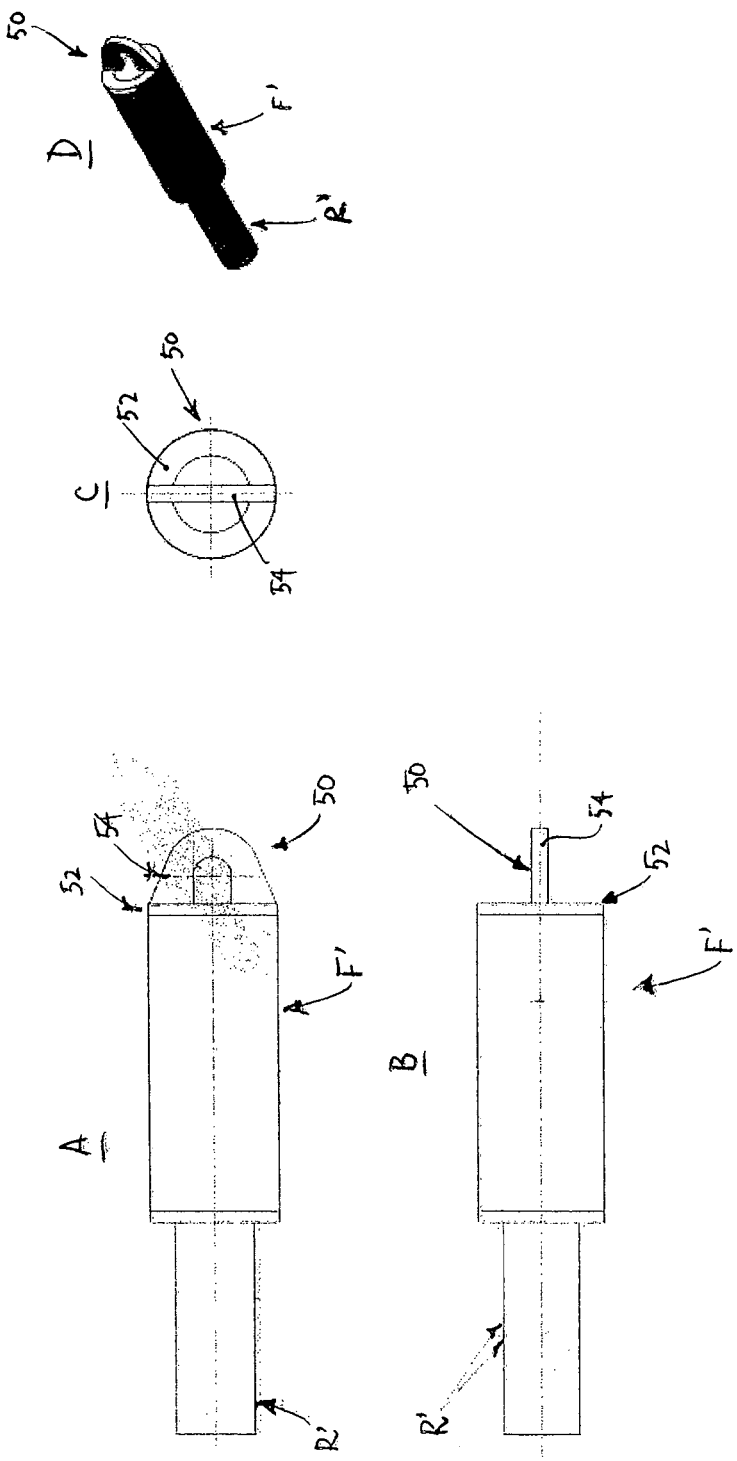
FIGS. 5A to 5D respectively show side, plan, end and perspective views of a second embodiment of a ferrule having been die-pressed onto the end of a dragline rope.

A ferrule die-pressing procedure was employed, which adopted a methodology whereby an assembly of the ferrule and a dragline rope were pushed through a die with an interference fit. This was observed to effectively extrude the ferrule over the rope, resulting in the ferrule being clamped onto (deformed against) the rope. Referring to FIG. 6, the die-press was set up as follows:
1. A dragline rope end was positioned through the die from the back (parallel) opening $O_b$, exiting through the front (tapered) opening $O_f$. The rope R was a multi-stranded wound wire rope of e.g. 6 or 8 wire strands, helically wound around a core or king wire. Each such strand defined a lay length, being the linear length of a rope portion corresponding to a strand having spiralled once around the rope circumference.
2. A ferrule F with its inside lined with the aluminium sleeve S was then slid over the rope end, leaving a calculated length of rope protruding P beyond the ferrule (as shown). This positioning allowed for deformation during the press, whereby the resultant deformed ferrule generally aligned with the rope end (see FIG. 4).
3. Prior to locating the ferrule on the rope, the ferrule had an edge chamfered C on one of its ends (in-use outermost end). This chamfer functioned to allow the metal to flow and form a square end once the ferrule had been die-pressed onto the rope.
4. The outer surface of the ferrule was coated with a special lubricant (such as Molykote 106 anti-friction coating; trade mark of Dow Corning) to assist the process when the ferrule assembly was being pressed through the die D. Prior to locating the ferrule on the rope, the outer surface of the ferrule had been finely threaded T (e.g. in a lathe) to ensure the lubricant coating entered the die during pressing, to help facilitate passage through and deformation of the ferrule in the die.
5. A mandrel M on a hydraulic ram Ra was then used to press the ferrule, together with the rope, through the die D. The ferrule and sleeve assembly were deformed against and extruded back over the rope end, until they assumed the configuration as shown FIG. 4. Generally, for each dragline rope, as a result of the die-pressing operation, the ferrule was observed to have a reduction in overall diameter, and its overall length was increased by approximately the length of the initial rope protrusion P.
6. With the ferrule now die-pressed onto the rope, the aluminium sleeve was observed to provide improved grip between the rope and the ferrule body. In this regard, a number of pull-off tests were conducted, and the results are presented in the graphs of FIGS. 7 and 8.
7. Optionally, a lug 50 (as shown in FIG. 5) was welded onto the end of the ferrule F, to improve its handling, as well as to improve its interconnectivity with a socket-type connector in a dragline.

Example 2

Pull-Off Testing of Ferrule on Dragline Rope

Various dragline rope products resulting from the general procedure of Example 1 were subjected to ferrule pull-off testing, to determine the suitability of the ferrule for use on a dragline rope, as well as optimum ferrule and die press set-ups and configurations. The results of these tests are presented graphically in FIGS. 7 and 8.

To test the pull-off force (in kN) of a ferrule die-pressed onto a dragline rope product, so as to indicate the strength of the ferrule-to-rope attachment, the following procedure was implemented:
Load the dragline rope into an Avery 3000 kN testing machine.
Seat the ferruled rope end into test blocks, specially designed to transfer load onto the end of the ferrule.
Apply force at a predetermined strain rate.
Continue until ferrule-to-rope bond breaks, and record the load at breakage.

Figure 8:
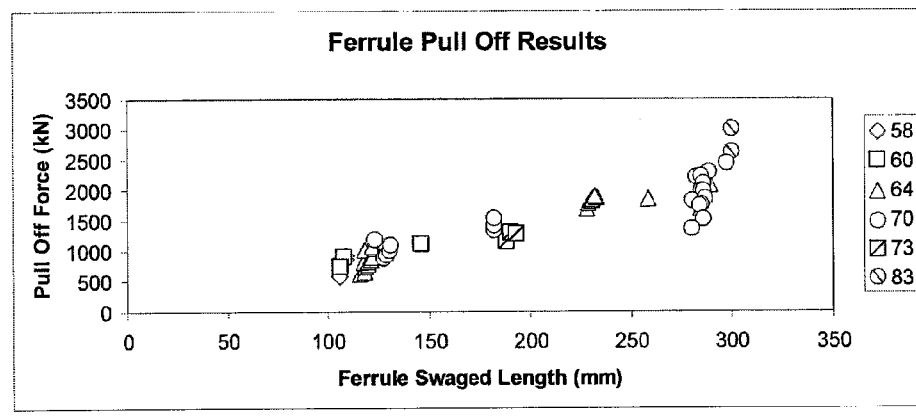

For each helically wound wire dragline rope, the ferrule had been die-pressed to have a length of up to approximately 70% of the rope lay length. This is indicated in FIG. 8, where it can be seen that for a number of rope diameters (58-83 mm) the pull-off force increased with the die-pressed ferrule length up to a maximum.

It was observed that the pull-off strength (expressed as percentage of rope breaking force) was directly related to the length of ferrule as a percentage of the rope lay length. It was noted that a pull-off strength of approximately 70% of the rope breaking force would enable the rope to perform well in dragline applications, as compared with existing ropes.

Figure 7:
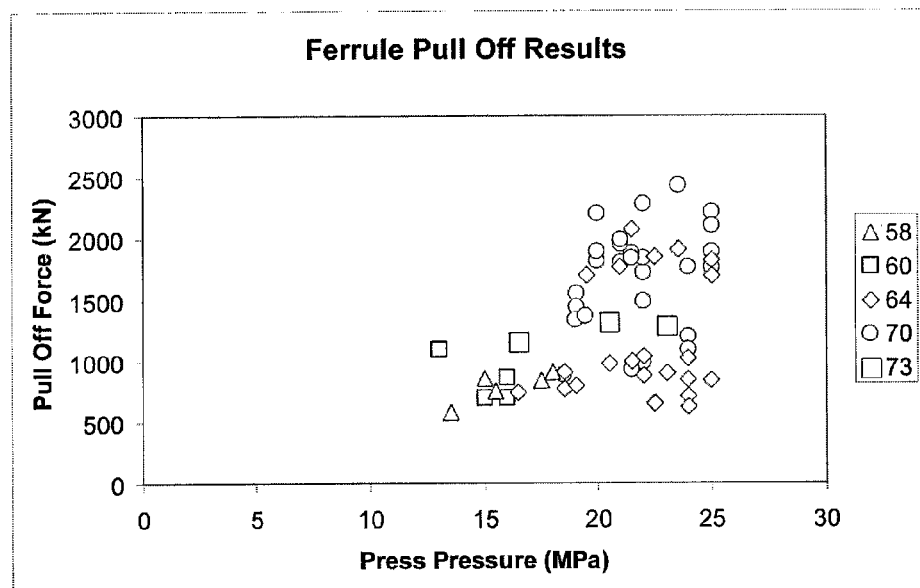
FIGS. 7 and 8 respectively show plots of ferrule pull-off force (in kN) vs die press pressure (FIG. 7) and ferrule length (FIG. 8).

It was further observed that pull-off force generally increased with the pressure employed in the die press up to a maximum, and then did not increase further with increasing die press pressure. This is indicated in FIG. 7, where it can be seen for a number of rope diameters (58-95 mm), that the pull-off force increased with the die-pressed ferrule length up to a maximum, after which maximum there was no particular increase in the pull-off force.

Whilst specific embodiments of a ferrule, and a method of attaching the ferrule to a dragline rope, have been described, it should be appreciated that the ferrule and method may be embodied in other forms.

For example, when the resultant die-pressed ferrule length approximately corresponded to four times a diameter of the rope the resultant pull-off strength was observed to be increased. This measure provided an alternative means of predetermining ferrule length.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the ferrule and method as disclosed herein.

The invention claimed is:

1. A method for attaching a ferrule to a dragline rope comprising:
   locating the dragline rope in a die of a die-press;
   locating over the dragline rope a ferrule that is lined internally with a deformable material;
   forcing the ferrule longitudinally through the die whereby the ferrule is caused to be internally expanded and be extruded back over the dragline rope, causing the lining to deform directly against the dragline rope and fastening the ferrule to the dragline rope.

2. A method as claimed in claim 1 wherein the ferrule is located over the dragline rope adjacent to but inset from an end thereof.

3. A method as claimed in claim 2 wherein the amount of ferrule inset corresponds to an amount the ferrule is caused to be extruded back over the dragline rope to its end during the forcing of the ferrule longitudinally through the die.

4. A method as claimed claim 1 wherein the dragline rope is a multi-stranded wound wire rope, with each strand defining a lay length, wherein the ferrule is die-pressed onto the rope so as to provide a ferrule length that is approximately 70% of the lay length.

5. A method as claimed in claim 4 wherein the ferrule has a length corresponding to approximately four times a diameter of the rope once the ferrule has been die-pressed onto the rope.

6. A method as claimed claim 1 wherein the ferrule is forced through the die by a mandrel that is initially arranged to oppose the die as well as an end of the ferrule, whereby the mandrel is advanced against the ferrule to force it longitudinally through the die.

7. A method as claimed in claim 1 wherein, prior to locating the ferrule over the rope, the ferrule has a number of grooves formed on its external surface.

8. A method as claimed in claim 1 wherein a body of the ferrule is of metal and, prior to locating the ferrule over the rope, the ferrule has a number of grooves formed on its internal surface, with the grooves being adapted for interacting with the lining.

9. A method as claimed in claim 8 wherein the lining comprises a sleeve of a metal of lower yield strength than the ferrule, with the sleeve being located within the ferrule body prior to locating it over the rope.

10. A method as claimed in claim 9 wherein the metal of the sleeve comprises aluminium.

11. A method as claimed in claim 7 wherein, during the forcing of the ferrule through the die, the lining is also caused to be extruded back over the rope.

12. A method as claimed in claim 1 wherein the ferrule is fastened to an end of the dragline rope and, after fastening the ferrule to the rope, the ferrule has a lug secured to a distal end thereof.

13. A dragline rope comprising a ferrule die-pressed onto the dragline rope in accordance with the method of claim 1.

* * * * *